United States Patent Office 2,848,113
Patented Aug. 19, 1958

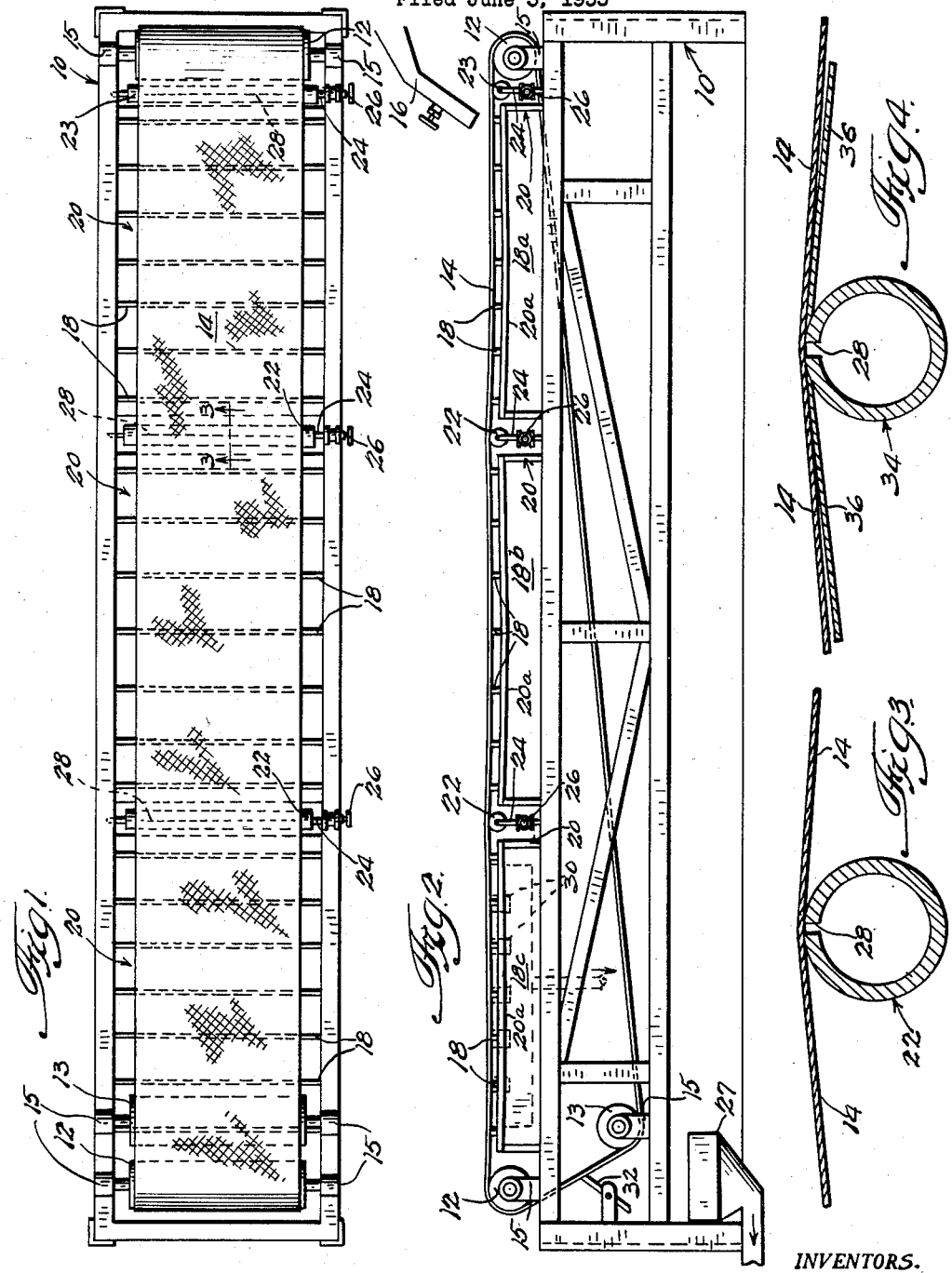

2,848,113

CONTINUOUS BELT FILTER AND WASHING DEVICE FOR SAME

Laurene O. Paterson and Clyde Lewis Bragg, Adrian, Mich., assignors to Drug Processors, Inc., Adrian, Mich., a corporation of Michigan Application June 3, 1955, Serial No. 513,068

2 Claims. (Cl. 210—393)

This invention relates to an improved endless belt filter and, more particularly, pertains to a belt filter adapted to deliquefy and wash gelatinous and other like precipitates which are difficult to treat on a pervious filtering medium.

It is well recognized in the filter art that certain precipitates, which tend to assume a gelatinous or fine-grained structure, are very difficult to deliquefy in conventional filters which employ cloth or wire mesh. In processing such precipitates, the pores of the filtering medium soon become clogged, resulting in slow passage of the liquid therethrough. In all instances, attempts to wash such precipitates while on the filter have been notoriously unsuccessful.

Several types of endless belt filters are presently in use. Among these are drum filters which depend upon vacuum inside the drum to pick up the slurry from a tank through which the filter rotates. Drum filters are unsuitable for the intended purpose, since the application of the vacuum acts to imbed the precipitate in the filtering medium thereby clogging the same.

Continuous belt filters, wherein the slurry is fed on the surface of a moving belt, have also been employed. The latter filters are characterized by having their working area supported in a substantially horizontal plane so that the action of gravity upon the liquid component may be utilized to the fullest extent. Moving belts of this type have been used successfully with free-filtering materials. When utilizing belt filters of this type, the filter cake is usually washed from above by a series of jets impinging on the belt. The washed precipitate is removed from the belt by a blade or vibrator, and the belt is washed free of any imbedded precipitate during its return journey to the filtering area. It may be readily realized that such washing of a gelatinous or fine-grained precipitate on the belt results in the loss of fines through the belt. Furthermore, the conventional back-washing of a belt carrying imbedded precipitate leads to excessive loss where the solid phase is the desired product.

A commercially feasible belt filter for use with gelatinous or other fine-grained precipitates must provide a system of purging the pores of the cloth or wire mesh, which action does not result in loss of product. The washing of the precipitate on the belt must be carried out in such a manner that the removal of soluble impurities is continuous and effected concurrently with deliquefying. Furthermore, turbulence on the surface of the belt must be maintained at a minimum to prevent loss of precipitate through the belt.

It has been discovered that the most efficient method of treating a gelatinous precipitate on a belt filter is to supply the wash liquid from below and through the belt. It is possible to provide this wash liquid by a series of transversely placed jets which impinge on the bottom of the belt. The liquid penetrating the belt will remove imbedded precipitate and also serve to wash the cake. However, with a fine-grained cake, this method of washing results in excessive turbulence on the surface of the belt and may lead to loss of precipitate through the belt. In accordance with the provisions of the invention herein disclosed, it has been found that a satisfactory means for supplying the wash liquid is through a series of slotted or linearly perforated tubes extending across the entire width of the belt. The slotted or perforated portion of the tube is held in close contact with the underside of the belt. Wash liquid may thus be fed under pressure through the belt, and the volume regulated so as to gently lift and break the cake. In this manner, the pores of the mesh are continuously purged of precipitate and simultaneous washing of the filter cake is effected.

It is an object of this invention, therefore, to provide an endless belt filter which is particularly adapted for the continuous deliquefying and washing of a gelatinous precipitate or other similar substance difficult to filter.

It is another object of this invention to disclose an endless belt mechanism incorporating therewith a washing device which functions to clean the interstices of the moving belt and concomitantly wash the precipitate carried thereby.

It is a further object of this invention to provide an endless belt filter composed of a minimum number of parts, all of which are readily obtainable and fabricated from comparatively inexpensive materials.

It is a still further object to provide an endless belt filter which is subject to fine control whereby the desired quality of the final product and flexibility of operation is assured.

The above and other objects will become more manifest from the following detailed description, accompanying drawing and appended claims.

In accordance with one embodiment of this invention, a continuous pervious filter belt is mounted on a plurality of rotatable drums. One of the drum members is rotatably actuated by a motive means and thus serves to move the continuous belt. Two uppermost drum members are horizontally aligned, thereby horizontally aligning an upper portion of the filter belt. Disposed transversely to the travel of the filter belt and slidably engaging the undersurface of the horizontally aligned upper portion of the filter belt is a plurality of scraping bars which serves to support the belt and also accelerates the removal of the liquid contained in the slurry deposited on the opposed surface of said belt. Interposed at regular intervals between the scraping bars are linearly slotted or perforated washing tubes which comprise a feature of this invention. The washing tubes are slightly raised above the plane of the scraping bars to assure contact with the undersurface of the belt. The tubes are connected to a source of wash fluid in which the fluid is maintained under pressure. The wash fluid is thus forced to emerge from the perforations or slots which are disposed toward the undersurface of the filter belt, and traverse the same, thereby cleaning the filtering medium. The wash fluid simultaneously gently raises and breaks the filter cake deposited on the filter belt, thereby washing said cake concomitantly with the filter belt.

For a more complete understanding of this invention, reference should now be had to the drawings; wherein—

Figure 1 is a top plan view of one form of continuous filter embodying this invention;

Fig. 2 is a side elevational view of the embodiment illustrated in Figure 1;

Fig. 3 is a sectional view taken on line 3—3 of Figure 1 and shows the positioning of the linearly slotted tubes; and Fig. 4 is a sectional view of a modified form of washing tube.

Referring now to the drawings and, more particularly, to Fig. 2, a framework 10 is illustrated upon which are journalled, by means of brackets 15 or other suitable means, rotatable drums 12 and 13. Disposed about the drums and supported in part thereby is a continuous belt 14. It will be noted that the two uppermost drums 12 are in a substantially horizontal plane. Consequently, the top portion of the pervious continuous filter belt 14 interposed between the two drums 12 is also in a horizontal plane. Being horizontally aligned, the uppermost portion of the pervious filter belt 14 enables slurry positioned thereon to obtain the optimum benefits from the gravitational forces which assist any liquid contained in a slurry disposed thereon to flow through the interstices of the pervious belt. The belt 14 may consist of filter cloth, wire mesh, or any other pervious material adapted for filtering purposes.

The rotatable drum 13 is driven by a motive means not shown. Thus, the pervious belt 14 may continuously rotatably engage the drums in the normal course of operation. Tensioning means, also not shown, may also be provided at the lowermost drum 13 to regulate the tension on the belt 14. It is obviously desirable that the motive means for the drive drum 13 be capable of imparting variable speed to the belt 14 to insure flexibility in the normal course of filter operation.

Positioned above the right-end portion of the pervious belt 14 is a valved inlet pipe 16 which is adapted to feed a gelatinous or similar precipitate onto the underlying portion of the belt 14. It is apparent that the drive drum 13 is intended to move the pervious belt 14 in a counterclockwise direction.

Disposed beneath the horizontal portion of the belt 14 and, also, interposed between the opposed horizontally aligned drums 12 is a plurality of scraping bars 18 which is supported by boxlike structures 20 which are, in turn, supported by the main frame 10. It will be noted from Fig. 2 that the scraping bars 18 assist the drums 12 in maintaining the upper portion of the pervious belt 14 in a substantially horizontal position. It will be further noted that the scraping bars 18 are distributed into three main groups which function as deliquefying stations along the continuous belt travel.

It is thus seen that the bars 18 have the dual function of maintaining the upper portion of the pervious belt 14 in a horizontal position and, also, of facilitating the deliquefying of the slurry positioned on the top surface of the horizontal portion of the belt 14 by slidably engaging or scraping the undersurface thereof.

Interposed between the deliquefying stations defined by the scraping bars 18 are washing tubes 22. As will be noted from Fig. 1, each of the washing tubes 22 is disposed transversely to the moving pervious belt 14. It will also be noted that the washing tubes 22 traverse the entire width of the pervious belt 14. Each tube member is provided with a linear slot or a plurality of aligned linear apertures. The slots or apertures are disposed either normally (see Fig. 3) or at a slight angle to the undersurface of the top portion of the pervious belt 14; the angular disposition of the slots or perforations being inclined in the direction of the movement of the belt for purposes which will hereinafter be made apparent. A conduit 24 is connected to each of the washing tubes 22 and is, also, in communication with a source of wash fluid; the latter fluid is adapted to wash the filter cake being formed on the top surface of the belt 14. Interposed in each conduit 24 is a valve member 26 which regulates the flow of wash fluid into its respective washing tube.

In the normal course of operation, a gelatinous or like precipitate is deposited by means of the feed pipe 16 on the right top end portion of the pervious filter belt 14; drive drum 13 moves the pervious velt in a counterclockwise direction. Consequently, the aggregate proceeds across the scraping bars 18 over the first deliquefying station 18a in the process of traveling from right to left. Having passed across the last scraping bar in station 18a, the aggregate has been substantially freed of the liquid previously mixed therewith and a cake is formed. The filter cake thus formed proceeds to be slidably moved over the top peripheral portion of the slotted (or perforated) washing tube 22. It will be noted that each of the washing tubes 22 is raised above the plane of the scraping bars 18; thus slidable contact between the undersurface of the top portion of the belt 14 and the top peripheral portion of the washing tubes 22 is assured at all times. It will be further noted that, to facilitate slidable engagement between the scraping bars 18, the washing tubes 22 and the belt 14, the top surfaces 20a of the supporting structures 20 may be bowed or concave as illustrated.

Simultaneously with the actuation of the drive drum 13, wash fluid is sent through conduits 24 in communication with the washing tubes 22. Thus, upon passing under the slotted portions of apertured portions of the tubes 22, the wash fluid emerging is under sufficient pressure so as to readily pass through the interstices of the pervious belt 14. The wash fluid contacts the undersurfact of the filter cake which has been formed as a result of passing across the deliquefying station 18a, gently lifts the filter cake from the top surface of the belt, and, in the course of so doing, breaks it.

It is thus seen that, in the course of passing over the washing tubes 22, the wash fluid emerging through the slot 28 simultaneously cleans the pervious belt, since the wash fluid passes therethrough, thereby removing any imbedded precipitate, and, also, washes the filter cake by gently breaking the same and coming into intimate contact therewith. The flow of the wash fluid may readily be adjusted by means of the valves 26, or other equivalent means, to effect a minimum of turbulence at the belt-cake interface whereby not even fine-grained precipitates are lost through the belt.

Having passed over the first washing tube 22, the cake and wash fluid mixture is once again deliquefied by passing it over the second series of scraping bars 18, which constitutes a second deliquefying station 18b. The cake being formed after passing over the last scraping bar in station 18b then proceeds over the second washing tube 22 interposed between the two deliquefying stations 18b and 18c. Precisely the same operation is effected as previously described with reference to the first washing tube. The filter cake and wash fluid mixture then proceeds over the final series of scraping bars 18 which make up the final deliquefying station 18c. Suction may be applied to the underside of the belt 14 by a series of openings 30 protruding through the apertured top surface of the supporting structure in station 18c. The openings are in communication with a suction pump (not shown) to faciltate the removal of effluent and thereby produce a drier cake. The cake adhering to the pervious belt 14 may be removed therefrom by contacting an angularly disposed knife member 32 which functions as a scraper. The product cake removed by the scraper 32 falls or is deposited in a hopper member 27, or is otherwise suitably collected, for further processing.

The pervious belt 14 having passed the scraper 32 is now substantially devoid of any cake and proceeds to rotatably engage the drive drum 13. The belt 14 continues to move in a counterclockwise direction to rotatably engage the drum 12 disposed on the right side of the illustrated apparatus. After having engaged the first of the horizontally aligned drums 12 and before engaging the first scraping bar 18 in the deliquefying station 18a, the pervious belt 14 first passes over a washing tube 23, whose primary function is to clean the belt before any slurry is deposited thereon by means of the inlet feed pipe 16. It will be noted that by washing the belt while traveling in the upper horizontal plane the loss of any product which may be imbedded in the interstices of the pervious belt is avoided. It is obvious that, if the belt is back-washed in the course of its travel between the drive drum 13 and the first horizontally aligned drum 12, any product which may have been imbedded in the belt will fall from the belt and be lost.

The wash fluid may be any suitable solvent adapted to cope with the impurities present in the slurry. It is also apparent that the number of deliquefying stations and washing tubes is not restricted to the number illustrated. The desired purity of the final product and the nature of the product involved govern the number of stations. The force of the wash fluid emerging through the washing tubes, the speed of the belt and the intensity of suction which may be utilized in any of the deliquefying stations are variable factors affecting the end product. The control of said factors is simple and obviously within the skill of the filter operator.

In Fig. 4 a modified form of washing tube 34 is illustrated. Washing tube 34 is provided with wing portions 36 which tangentially join the tube peripheral portions defining the slot 28 disposed along the length of the tube. As a result of the wings 36, the wash fluid forced through the slot 28 is sealed between the belt and wing surfaces and prevented from rapidly running down and around the circumference of the tube. The wings 36 assure that the wash fluid will intimately contact the overpassing filter cake.

It is thus seen that an apparatus has been presented which is particularly adapted to filter and wash gelatinous and other precipitates filterable only with great difficulty. Utilizing the construction illustrated, the filtering and washing of gelatinous and fine-grained precipitates may be efficiently carried out simultaneously with the cleansing of the filtering medium employed. Although usually no retaining means are needed with a gelatinous precipitate to maintain the same on the pervious belt 14, retaining side walls (not illustrated) may be employed in conjunction with the belt 14 to maintain a more freely flowable solid-liquid slurry on the endless belt. It is obvious that the illustrated apparatus may be readily constructed from inexpensive parts and may be modified in many respects without departing from the basic inventive concept herein disclosed. It is, for example, obvious that the number of drums or other equivalent means supporting the pervious belt may vary upwardly from two and is not critical. Also, as has previously been mentioned, the linear slots or apertures of the washing tubes may be either disposed normally to the undersurface of the belt or inclined in the direction of belt travel, whereby the wash fluid will also be deflected in the direction of belt travel. It is intended, therefore, that the apparatus disclosed be limited only by the scope of the appended claims.

We claim:

1. In a continuous belt filter having a continuous pervious belt mounted on guide means whereby a portion of said pervious belt is always maintained on a substantially horizontal plane, the improvement comprising at least one washing tube disposed across the entire width of said pervious belt and so positioned relative thereto so as to slidably engage that portion of the belt maintained on a substantially horizontal plane, a source of wash fluid maintained under pressure in communication with said washing tube, said washing tube being appropriately formed so as to simultaneously eject said wash fluid through said pervious belt.

2. In a continuous belt filter adapted to form a filter cake from a gelatinous precipitate or the like, the combination comprising an endless pervious belt, support means maintaining an upper portion of said pervious belt on a substantially horizontal plane, spaced portions of said support means scraping the undersurface of said pervious belt upper portion, apertured washing tubes extending across the entire width of said pervious belt upper portion which is maintained on a horizontal plane and slidably contacting the undersurface of said belt portion, a fluid source in communication with said washing tubes, valve means regulating the pressure of the fluid emerging through said washing tubes, the apertures in said washing tubes being disposed toward said pervious belt undersurface, the pressure of the wash fluid emerging through said apertured washing tubes in the normal course of operation being sufficient to penetrate said pervious belt and lift the filter cake which is positioned on the upper surface thereof whereby said cake may be washed and broken and said pervious belt simultaneously cleaned.

References Cited in the file of this patent

UNITED STATES PATENTS

| 1,235,027 | Harrison | July 31, 1917 |
| 2,314,048 | Ladewig | Mar. 16, 1943 |

FOREIGN PATENTS

| 692,831 | France | Nov. 11, 1930 |